United States Patent Office.

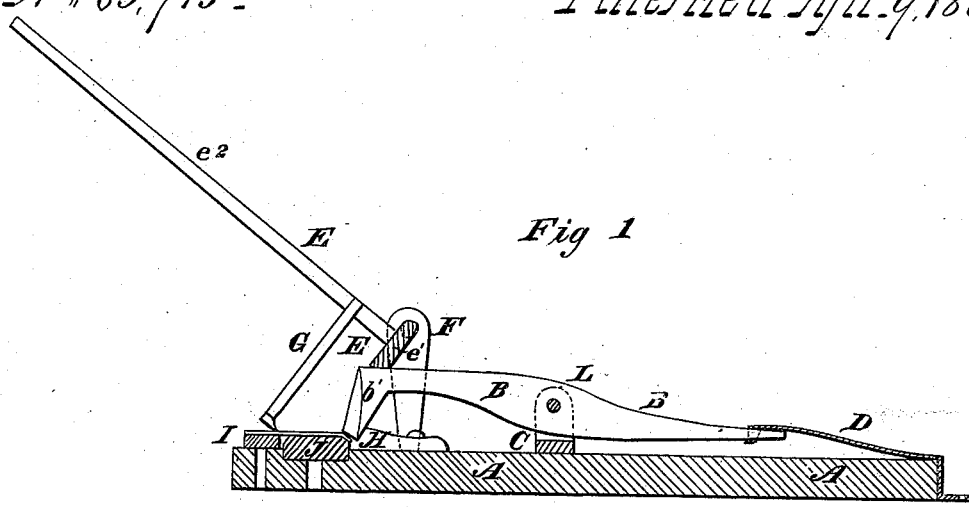
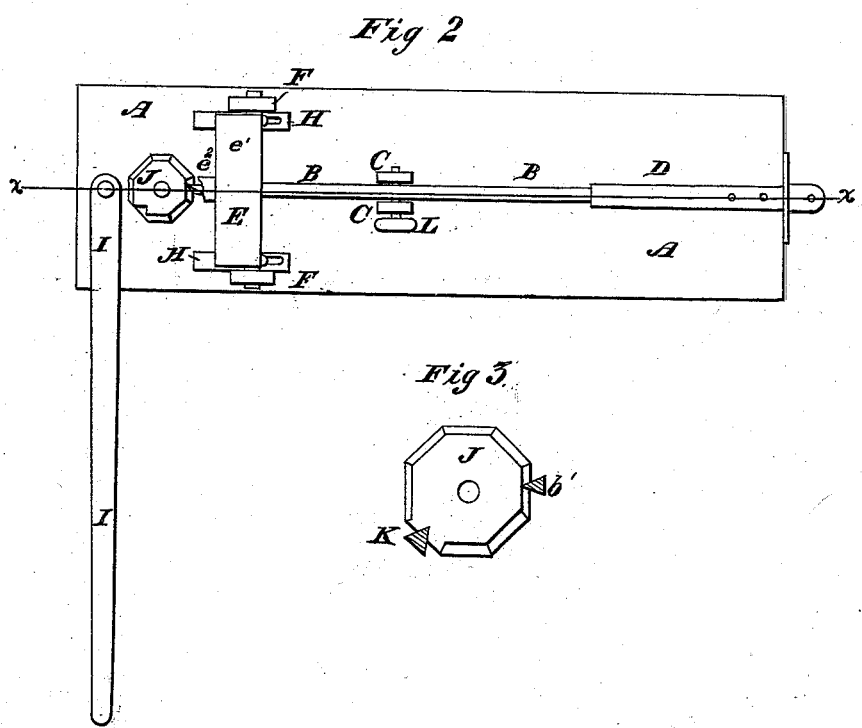

JOHN GARDNER, OF VIROQUA, WISCONSIN.

Letters Patent No. 63,715, dated April 9, 1867.

---

IMPROVEMENT IN SAW-SETS AND GUMMERS.

---

*The Schedule referred to in these Letters Patent and making part of the same.*

---

TO ALL WHOM IT MAY CONCERN:

Be it known that I, JOHN GARDNER, of Viroqua, Vernon county, State of Wisconsin, have invented a new and useful Improvement in Saw-Set and Gummer; and I do hereby declare that the following is a full, clear, and exact description thereof which will enable others skilled in the art to make and use the same, reference being had to the accompanying drawing, forming part of this specification, in which—

Figure 1 is a vertical longitudinal section of my improved saw-set and gummer, taken through the line $xx$, fig. 2.

Figure 2 is a top or plan view of the same.

Figure 3 is an enlarged top view of the anvil showing a section of the setting and gumming hammer-heads.

Similar letters of reference indicate like parts.

My invention has for its object to furnish an improved instrument for setting and gumming saws; and it consists, first, in the combination of the hammer, spring, cam-lever, and rest, with each other; and second, in the combination of the anvil with the hammer and with the bed-plate of the machine, the parts being constructed and arranged as hereinafter more fully set forth.

A is the bed-plate of the machine. B is the hammer, which is pivoted to a stud, C, attached to the bed-plate by a screw, L, as shown in figs. 1 and 2. D is a spring, one end of which is attached to the bed-plate A, and the other end rests upon the rear end of the hammer B, as shown in the drawings. The face of the hammer-head, $b^1$, is bevelled, to correspond with the bevel of the anvil. The head $b^1$ of the hammer is forced down upon the tooth of the saw, bending it down upon the bevel of the anvil by the cam-lever E. The cam $c^1$ of the cam-lever E is pivoted to the supports F. To this cam $c^1$ is attached a lever, $c^2$, by which the said cam is operated. When the cam-lever E is brought into the position shown in fig. 1, the cam $c^1$ pressing upon the head $b^1$ of the hammer B, and forcing it down upon the tooth of the saw, gives to the said tooth the proper set. The cam-lever E is always stopped at the same point by the rest G coming in contact with the blade of the saw, so that the same pressure may be applied to each tooth, giving to them all the same set. H are adjustable stops which are attached to the bed-plate by screws passing through slots in said stops, as shown in fig. 2. By moving these stops, against which the teeth of the said saw rests while being operated upon backward or forward, according to the length of the saw teeth, the teeth will all be in the same relative position upon the anvil when operated upon. I is a rest pivoted to the forward end of the bed-plate, and which may be turned to one or the other side of the instrument, to support the saw-blade, according as it projects from one or the other side while being operated upon. J is the anvil, the edges of which are bevelled, so as to give the required set to the teeth. This anvil rests in a seat formed in the bed-plate A, and is pivoted to the said bed-plate, as shown in fig. 1. The anvil J may have any desired number of sides, and to the edge of each side there may be given a different bevel, so as to give the desired set to the teeth of different saws. But in this case as many different hammers must be used as there are different bevels to the edges of the anvil, it being essential that the bevel of the face of the hammer should correspond to the bevel of the edge of the anvil in connection with which the said hammer is to be used. One of the edges of the anvil J is not bevelled, and in it is cut a notch having the same shape as the notches between the teeth of the saw. Into this notch fits the face K of the gumming hammer, as shown in fig. 3. The gumming hammer is made in the same general form, and operated in the same manner as the hammer B.

I claim as new, and desire to secure by Letters Patent—

The cam-lever E, pivoted to the posts F, rest G, hammer B, spring D, anvil J, and rest I, when all are constructed and arranged upon the bed-plate A as herein set forth, for the purpose specified.

JOHN GARDNER.

Witnesses:
   WM. F. LINDEMANN,
   H. L. RUSSELL.